United States Patent [19]

Lu

[11] Patent Number: 5,775,165

[45] Date of Patent: Jul. 7, 1998

[54] TRANSMISSION SHIFT CONTROL DETENT MECHANISM

[75] Inventor: Jian Gang Lu, Troy, Mich.

[73] Assignee: General Motors Corporation, Detroit, Mich.

[21] Appl. No.: 735,281

[22] Filed: Oct. 22, 1996

[51] Int. Cl.$^6$ ................................................. F16H 63/38
[52] U.S. Cl. ....................................... 74/473.28; 74/540
[58] Field of Search ........................ 74/475, 540, 473.28

[56] References Cited

U.S. PATENT DOCUMENTS

| | | | |
|---|---|---|---|
| 5,220,984 | 6/1993 | Ruiter | 74/475 X |
| 5,542,512 | 8/1996 | Mashara | 74/475 X |
| 5,598,740 | 2/1997 | Itoh | 74/475 |

Primary Examiner—Allan D. Herrmann
Attorney, Agent, or Firm—Donald F. Scherer

[57] ABSTRACT

A transmission shift control has a detent mechanism to provide a shift effort so that the operator has a sense of feel during shifting between ranges. During a manual shift between reverse and park, the shift effort or "detent feel" is normally higher than the effort occurring during manual shifts between other ranges. The detent mechanism providing the "detent feel" is comprised of a spring-biased roller in a notched detent plate comprised of rises and valleys. The spring urges the roller against the notched surface on the plate. The ramps or rises provide increased shift effort during movement of the plate from range to another. In each range, the spring-biased roller is disposed in the appropriate valley. A channel is formed in the plate to provide a path for the roller, such that the park to reverse shift effort is less than the reverse to park effort.

3 Claims, 3 Drawing Sheets

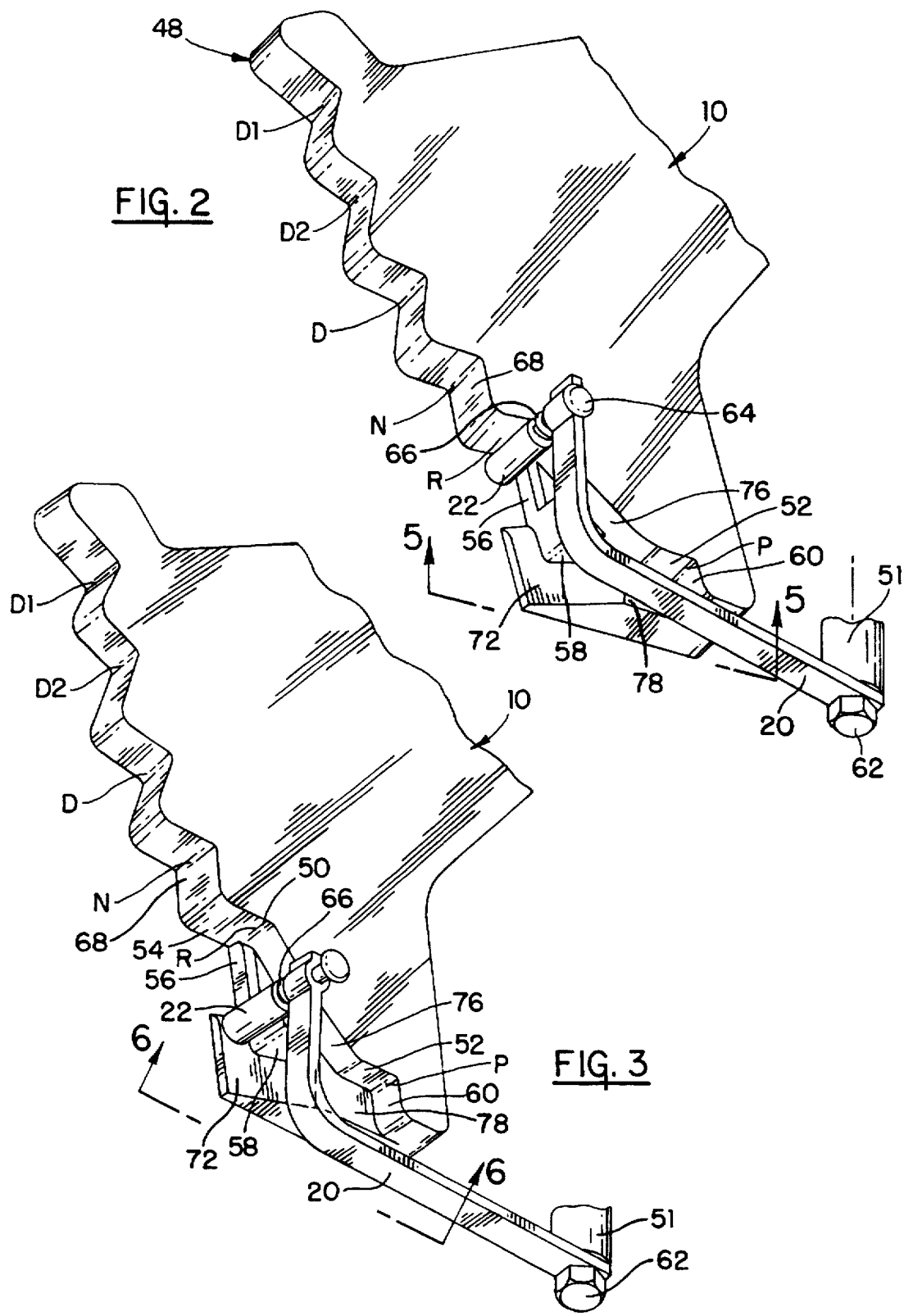

TRANSMISSION SHIFT CONTROL DETENT MECHANISM

TECHNICAL FIELD

This invention relates to transmission shift controls having a detent plate and a spring biased roller for providing shift effort.

BACKGROUND OF THE INVENTION

Shift control mechanisms have a park pawl mechanism with a detent system that provides for shift feel to the operator. A portion of the detent mechanism includes a notched detent plate and a spring-biased roller engaging the plate. As the plate passes under the roller, the operator is aware of the load change as the spring load changes in response to the rises and valleys of the notches. The force required to move the control from reverse to park is generally higher than the force between other adjacent positions on the detent plate to ensure the operator's awareness that park is being engaged or disengaged.

The increased effort is generally due to a larger rise on the notch between the reverse and park positions. The same spring load must be overcome during the park to reverse shift. However, if the vehicle was parked on a grade, the frictional forces in the park pawl mechanism increase the force necessary to shift from park to reverse. Various solutions, including pawl tooth design, have been proposed to decrease or otherwise neutralize the park pawl load during pullout from the park position.

SUMMARY OF THE INVENTION

It is an object of the present invention to provide an improved detent mechanism, wherein the park to reverse detent load is less than the reverse to park detent load.

In one aspect of this invention, a park to reverse channel on the detent plate bypasses the reverse to park rise. In this arrangement, the operator must overcome a detent force at one level to engage the park position but a lower level to disengage the park position. The detent spring and roller must accommodate the rise of the notched plate while entering the park position. However, the channel permits the rise to be bypassed during movement from the park to reverse position.

BRIEF DESCRIPTION OF THE DRAWINGS

FIG. 2 is an enlarged perspective view of a portion of the detent plate and spring mechanism shown in FIG. 1;

FIG. 3 is a view similar to FIG. 2 showing the detent plate in an alternate position;

DESCRIPTION OF AN EXEMPLARY EMBODIMENT

Figure 1:
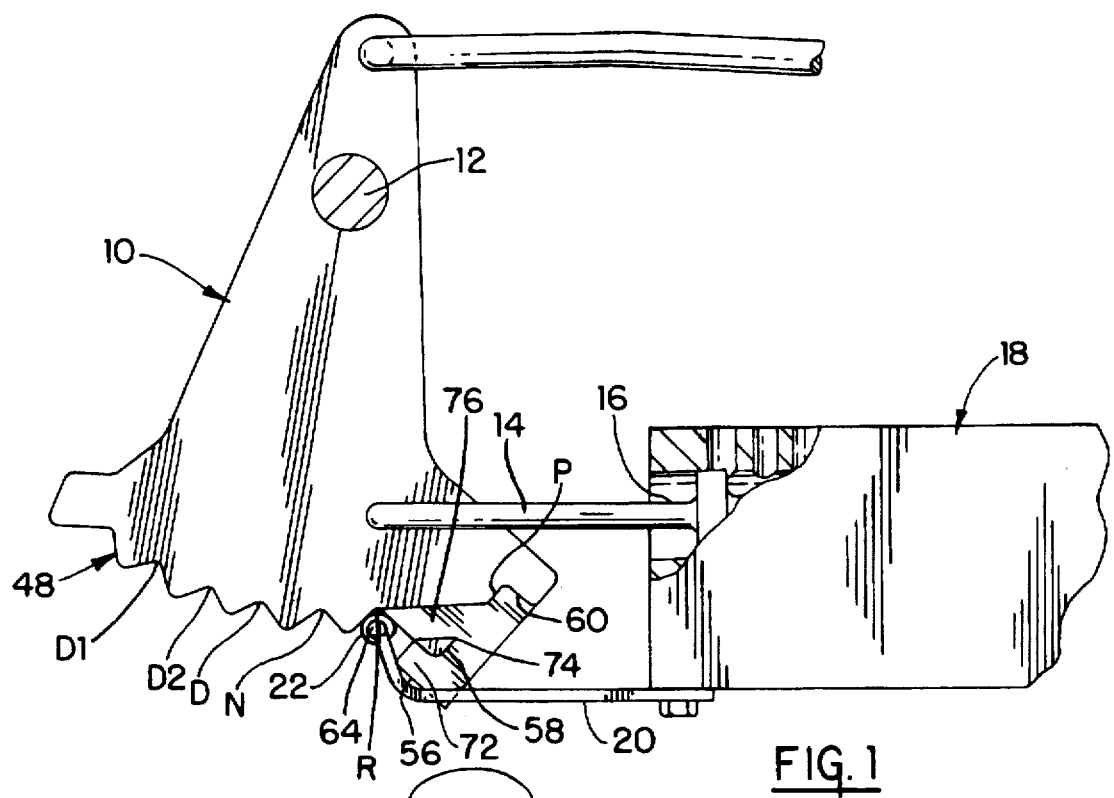
FIG. 1 is an elevational view of a portion of a transmission shift control system showing the shift detent plate.

The manual shift mechanism shown in FIG. 1 includes a detent plate 10 which is mounted for rotation with a manual shaft 12. The manual shaft 12 is connected through conventional rod control mechanisms with a vehicle steering system, not shown. In these steering systems, it is well known for a manual lever to be mounted on the steering column for controlling the operation of the manual shaft which is disposed within the transmission proper.

The detent plate 10 has secured thereto a rod 14 which operates a manual valve 16 slidably disposed slidably disposed in a transmission valve body or transmission housing 18 which is secured within the transmission housing, not shown. A detent spring 20 is secured to the valve body or the transmission housing and terminates at a distal end with a spring-loaded detent roller 22 which engages a plurality of notches on the detent plate 10.

As the operator manipulates the manual shaft 12, the spring-loaded roller 22 navigates or is manipulated over the notches of the detent plate 10 to provide the operator with a sense of feel as he shifts from one drive range to another.

Figure 7:
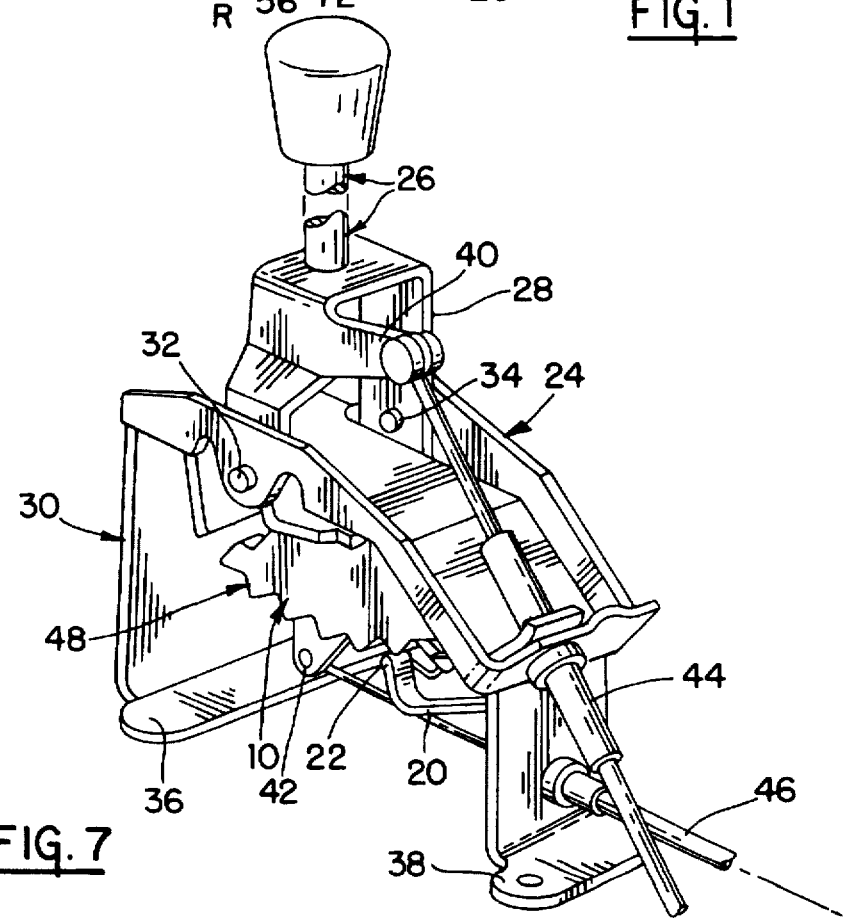
FIG. 7 is a perspective view of a transmission shift control system as used in console mounted shift environments.

FIG. 7, the shift mechanism is incorporated in a shift tower 24 which includes a manual lever 26 pivotally mounted through a bracket 28 to a base member 30. The bracket 28 is mounted on pins 32 and 34 which permit pivoting of the manual shift lever relative to the base member 30. The base 30 has a pair of feet 36 and 38 adapted to be secured to a vehicle body adjacent the operator. The shift tower mechanism shown in FIG. 7 is commonly termed a "console mounted" shift member mechanism.

The manual lever 26 has secured thereto a detent plate 10 which cooperates with a detent spring 20 and roller 22 to provide the operator with a sense of feel as the manual lever 26 is manipulated between drive ranges. The detent plate 10 in FIG. 7 and detent plate 10 in FIG. 1 can be identical in construction, if desired.

The manual lever 26 also has secured therewith or formed integral therewith, a pair of arms 40 and 42. The arm 40 is connected with a transmission control cable 44 and the arm 42 is connected with a brake transmission shift interlock cable 46.

As is well known, the brake transmission shift interlock cable 46 is connected to an electrical system or electrical control mechanism actuated by both the vehicle ignition, which is not shown, and the vehicle brake pedal, which is not shown. These mechanisms prevent the movement of the transmission manual shift lever 26 from the park position prior to the ignition being turned to the "On" position and the brake being actuated by the operator.

The transmission control cable 44 is connected with a lever not shown, which in turn is connected with a shaft similar to the manual shaft 12, shown in FIG. 1. A detent plate may also be included within the transmission assembly when the shift tower 24 is used. This provides two detent members within the transmission shift control system.

A secondary detent in the column-mounted shift controls, shown in FIG. 1, may also be included in the steering column. These types of detents are well known to those skilled in the art.

The detent plate 10, seen in FIG. 2, has a cam surface 48 which is comprised of a plurality of notches "P" for park, "R" for reverse, "N" for neutral, "D" for drive, "D2" for a secondary drive position, and "D1" for a low drive position. Each of the notches is comprised of a valley, such as, a first or "R" valley 50 and a second or "P" valley 52, shown in the reverse "R" and park "P" notches. Each valley has a rise or ramp, such as reverse rises 54 and 56, on either side of the "R" valley 50, and park rises or ramps 58 and 60, on either side of the "P" valley 52. The rise 60 will not be used since the detent plate 10 cannot be rotated sufficiently to cause the rise 60 to be negotiated by the roller 22.

The rises and valleys for the positions "N", "D2" and "D1" can be identical, if desired, or angular spacing between the drive control positions can be adjusted according to a desired pattern.

The detent spring 20 is secured to a stationary post or component 61 formed in the transmission housing or valve body 18 by a threaded fastener 62. The detent spring 20 has the detent roller 22 rotatably mounted thereon through a pin 64 secured to the detent spring 20. A helical bias spring 66 urges the detent roller 22 along the pin 64 away from the detent spring 20. The detent spring 20 urges the roller 22 into abutment with the outer surface of the cam 48.

As the detent plate 10 is rotated by the operator from one drive position or drive range to another, the roller 22 will ascend one rise and descend the adjacent rise into the succeeding valley. While the roller is being manipulated up a rise, the operator will feel an increase in shift effort or shift feel, such that the operator will be aware of a change in drive ranges. For example, when shifting from reverse to neutral, the roller will ascend the rise 54 reaching a peak and then descending a rise 68 until a neutral valley 70 is achieved. While the roller 22 is ascending the rise 54, the operator feels an increase in shift force. However, after crossing the peak and descending the rise 68, the operator will be aware that a new range is being accomplished or reached. The cam surface 48 formed between the "R" notch and the "P" notch includes the rise 56, a lateral guide wall 72, the rise 58, an exit ramp 74 formed on the rise 58, and a slot or channel 76.

Figure 5:
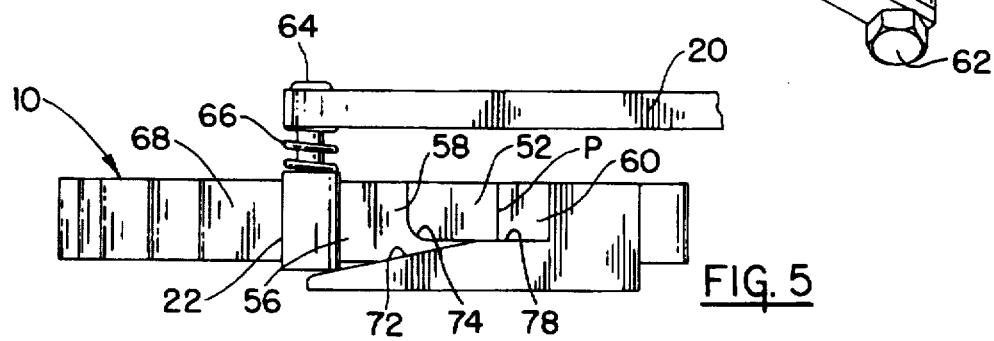
FIG. 5 is a view taken along line 5—5 of FIG. 2.
Figure 6:
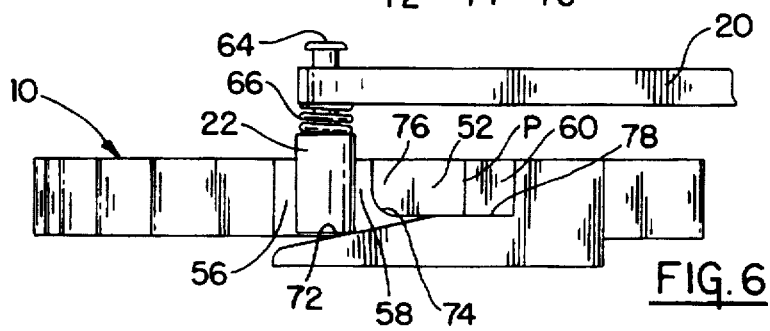
FIG. 6 is a view taken along line 6—6 of FIG. 3.

As seen in FIGS. 2 and 5, upon leaving the reverse "R" valley toward the "P" valley, the roller ascent the rise 56. To ensure that the rise 56 is abutted, the spring 66 urges the roller in the direction to contact the rise 56. As the detent plate 10 is pivoted by the operator, the roller will be abutted by the lateral guide wall 72. The lateral guide wall 72 converges into the ramps 56 and 58 to force the roller 22, as seen in FIGS. 3 and 6, toward the detent spring 20. The purpose for this deflection of the roller 22 will become evident in the following description.

Figure 4:
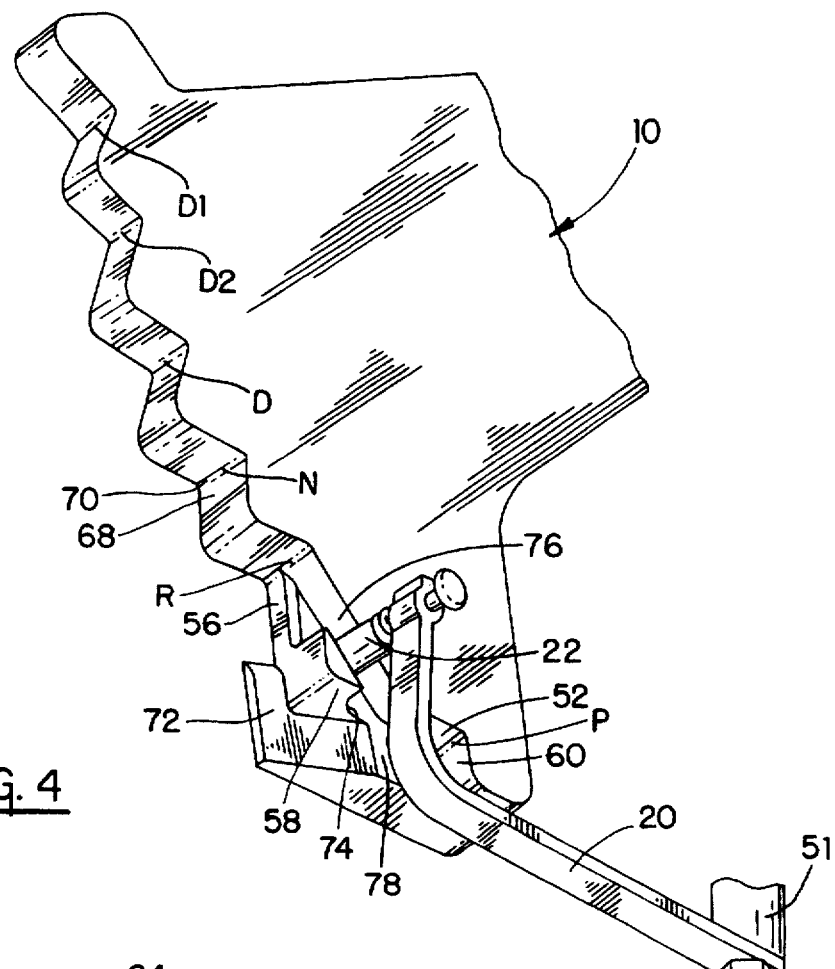
FIG. 4 is a view similar to FIG. 2 showing the detent plate and spring loaded roller during movement from park to reverse.

As the roller passes the peak between rises 56 and 58, the roller 22 has been urged toward the detent plate 20. The roller 22 will cross the exit ramp 74 which overlaps a portion of the park valley "P" prior to being positioned in the valley "P". Once in the valley "P", the roller 22 is maintained in its deflected position toward the spring 20 by a wall 78 which is disposed adjacent the park position. The wall 78 is aligned with the channel 76 such that when the operator manipulates the detent plate from the park position to the reverse position, the roller 22, as seen in FIG. 4, will negotiate the channel 76 thereby bypassing the rise 58 and the rise 56 on the return travel to the reverse valley "R". Once the reverse valley "R" is achieved, the spring 66 will urge the roller 22 away from the detent spring 20 thereby preparing the roller to engage the ramp 56 if the park position is to be re-established. Otherwise, the operator upon moving the detent plate from the reverse position to the neutral position, the roller 22 will negotiate the rises 54 and 68 to thereafter settle in the notch 70.

The detent spring 20 will, as should be evident at this point, create a shift effort or feel to the detent plate 10 as it negotiates the rises 56 and 58 from the reverse valley "R" to the park valley "P". However, on returning from the park valley "P" to the reverse valley "R", the roller 22 negotiates the channel 76 thereby bypassing the rises 58 and 56. Thus, the effort required to return the detent plate 10 to the reverse position is less than the effort required to achieve the park position.

The slot or channel 76 is shown on the detent plate which is manipulated by the operator and generally made of a hardened steel component. In the alternative, the detent plate can be formed of plastic and secured by riveting or bonding to a steel detent plate, or it may be positioned within the system separate from the normal sector plate manipulated directly by the operator. In either event, the detent plate having the reduced shift effort will provide the operator with a sense of shift feel on both a reverse to park manipulation and a park to reverse manipulation. It is also possible to use two or more of the reduced effort detent plates within the shift control system. For example, when the system shown in FIG. 7 is utilized, a detent plate on the shift tower 24 and within the transmission itself can be utilized, thus providing two detent plates, each of which can have a reduced effort channel or a park to reverse shift.

I claim:

1. A detent mechanism in a transmission shift control comprising:

a detent plate pivotally mounted for movement in response to an operator input;

a cam surface defining a plurality of rises and valleys formed on said detent plate including a park rise and a first valley and a second valley adjacent the park rise;

a channel communicating between said first valley and said second valley bypassing said park rise;

a detent roller spring biased to engage said cam surface and to follow said park rise during travel from said second valley to said first valley; and said channel providing an egress for said detent roller during travel from said first valley to said second valley.

2. A detent mechanism in a transmission shift control comprising:

a detent plate pivotally mounted for movement in response to an operator input;

a cam surface defining a plurality of rises and valleys formed on said detent plate including a first valley, a second valley and a park rise between said first and second valleys;

a channel communicating between said first valley and said second valley bypassing said park rise;

a wall defining a side surface of said park rise;

an exit ramp defining a portion of said park rise overlapping a portion of said channel adjacent said first valley;

a detent roller spring biased to engage said cam surface and to follow said park rise during travel from said second valley to said first valley; and said channel providing an exit route for said detent roller during travel from said first valley to said second valley.

3. The detent mechanism defined in claim 2 further comprising: a spring biasing said roller to contact said wall during travel from said second valley to said first valley, said wall urging said roller laterally of said cam surface for alignment with said channel when said first valley is engaged by said roller.

* * * * *